Feb. 26, 1957   R. C. LUNDQUIST   2,783,036
CUTTER HEAD FOR BORING TYPE CONTINUOUS MINER
Filed July 9, 1953   5 Sheets-Sheet 1
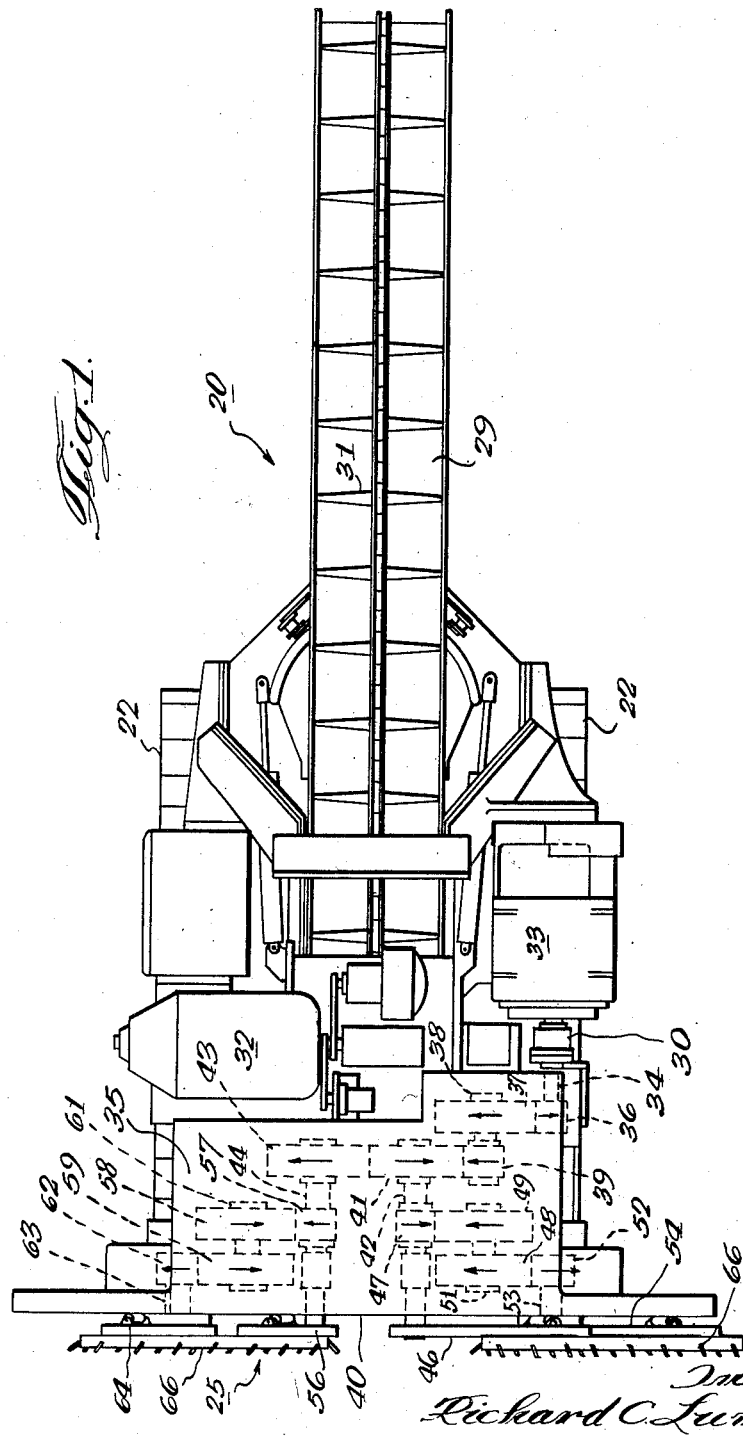

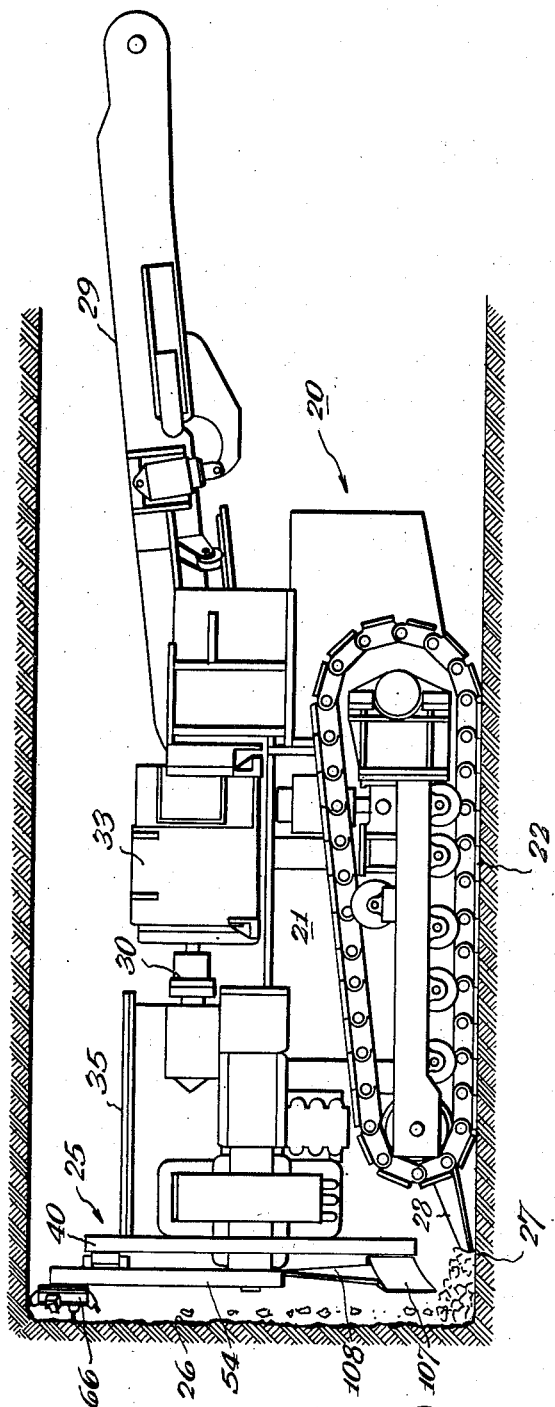

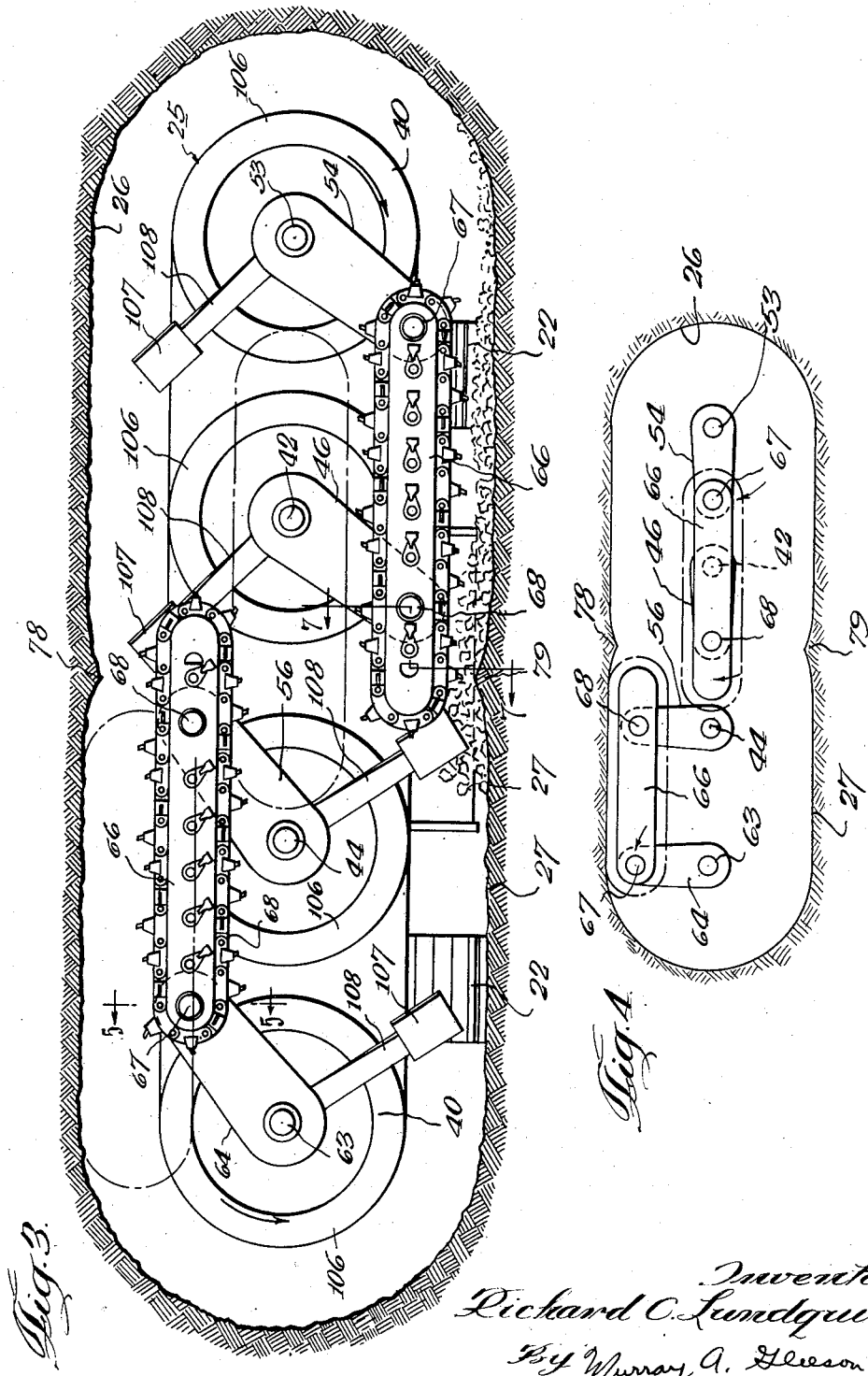

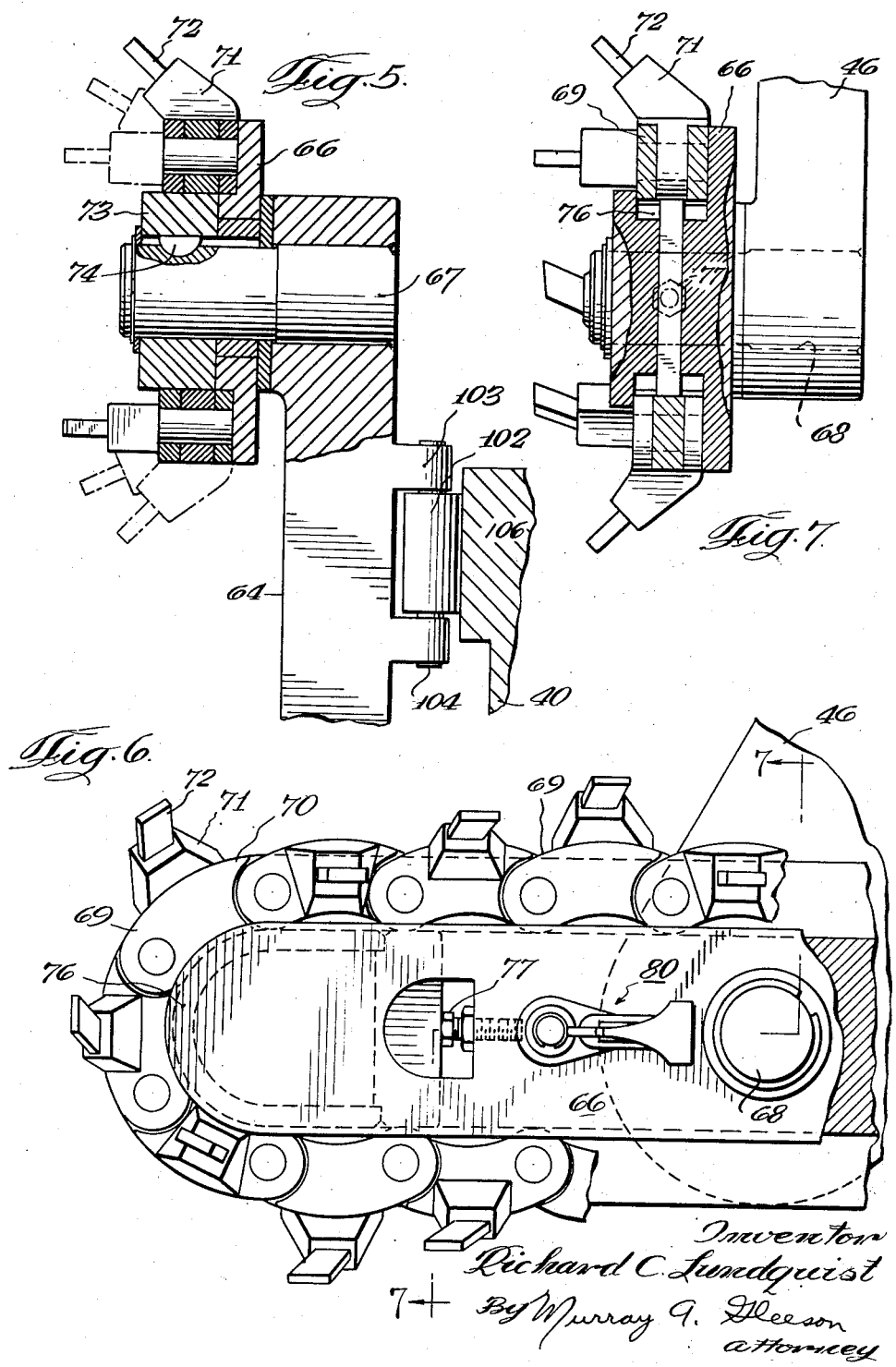

Feb. 26, 1957 R. C. LUNDQUIST 2,783,036
CUTTER HEAD FOR BORING TYPE CONTINUOUS MINER
Filed July 9, 1953
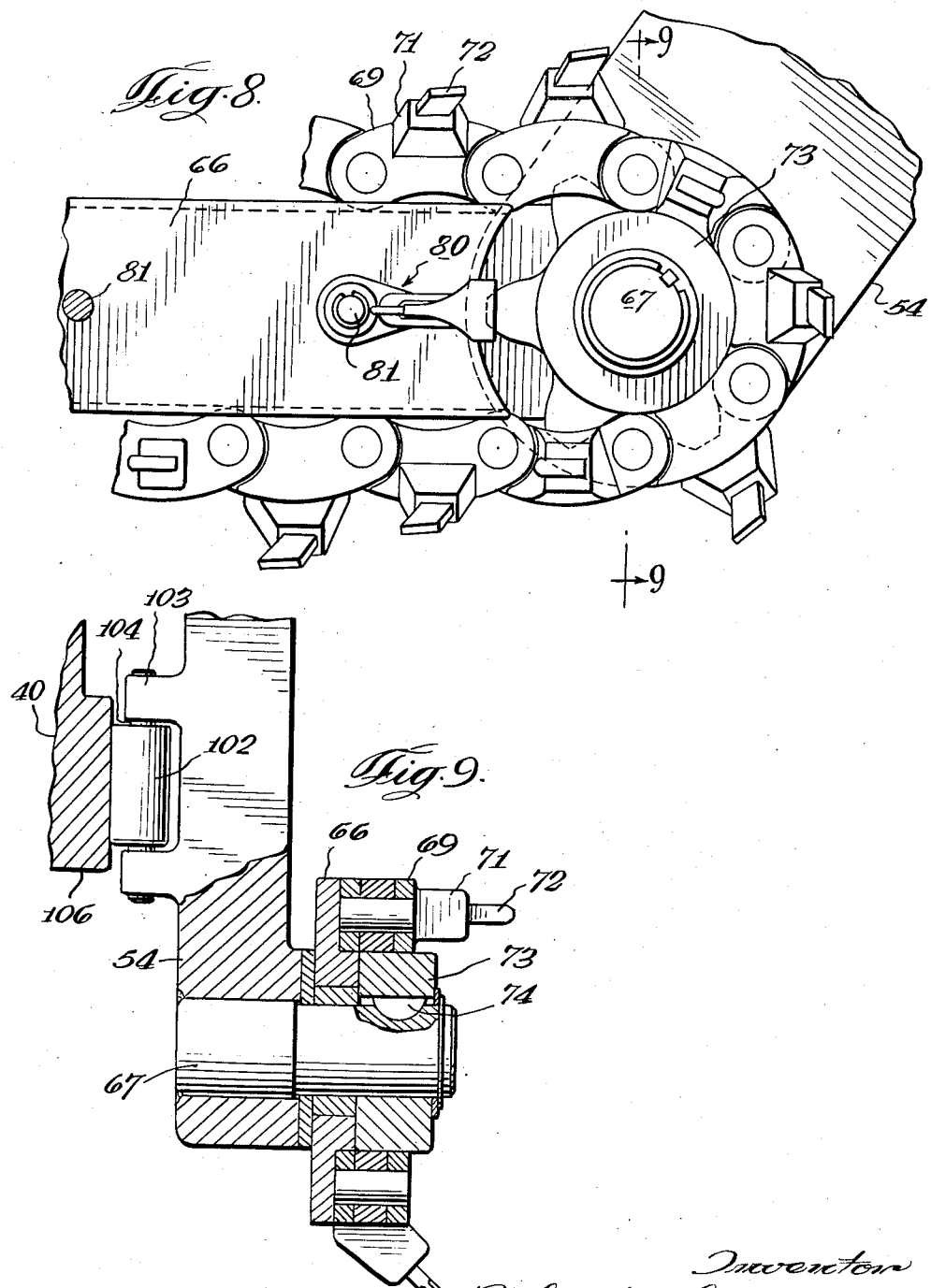
Inventor
Richard C. Lundquist
By Murray G. Glenn
Attorney

2,783,036
Patented Feb. 26, 1957

United States Patent Office

2,783,036

CUTTER HEAD FOR BORING TYPE CONTINUOUS MINER

Richard C. Lundquist, Chicago, Ill., assignor to Goodman Manufacturing Company, Chicago, Ill., a corporation of Illinois Application July 9, 1953, Serial No. 367,019

7 Claims. (Cl. 262—7)

This invention relates generally to improvements in mining machines of the type having a pair or more of side by side boring heads as broadly disclosed in McKinlay Patent No. 1,603,621.

Machines of the general type referred to have a cutting head comprising a pair of rotating arms mounted with cutter elements. The arms rotate on parallel axes and overlap in their rotation so as to cut a pair of overlapping contiguous bores. In thin seams the orbit of the outer ends of the rotating arms is of such a dimension that the support frame for the cutting head, the tramming mechanism and driving motors is but little smaller than the bores made by the cutting head. Consequently it is difficult if not impossible to place timbers around the machine for support of the mine roof.

According to the present invention the cutter head consists of paired rotating arms which rotate in an opposite direction to a similar pair of rotating arms and preferably in the same plane. Each pair of arms is connected by a cutter bar having cutting elements thereon, the cutter bar travelling orbitally and describing a rectangle with semi-circular end areas. The two cutter bars are arranged to clear each other in their orbital paths of opposite direction, so that the two cutter bars will cut in a seam of coal or the like a bore having a cross section substantially in the form of a long rectangle having semi-circular end areas.

The long dimension of such bore is such as to provide sufficient space on each side of the main frame of the miner to enable the room in which it operates to be roof-pinned or timbered as the case may be. Such dimension is also large enough to accommodate operators positioned at each side of the machine at all times whilst the machine is advancing in the bore.

With the foregoing considerations in mind it is a principal object of the invention to provide an improved cutting head for a continuous miner of the type mentioned, such cutter head being characterized by being able to provide a pair of contiguous over-lapping bores having a relatively large width or base as compared to its height.

Another object is to provide an improved cutting head characterized by paired rotating arms connected by an orbitally moving cutter bar carrying cutter bits so as to provide a bore having the dimensions aforesaid.

Still another object is to provide an improved cutter arm for a continuous miner having bits thereon which are always moving tangentially to the radius of the cutter bar when moving in such orbital path.

Other objects and important features of the invention will be apparent from a study of the specification following taken with the drawings which together show and describe a preferred embodiment of the invention and what is now considered to be the best mode of practicing the principles thereof. Other embodiments of the invention may be suggested to those having the benefit of the teachings herein, and it is therefore intended that the invention not be limited by the precise embodiment herein shown, other embodiments being intended to be reserved especially as they fall within the scope and purview of the subjoined claims.

In the drawings:

Fig. 1 is a plan view of a continuous miner having embodied therein the improvements according to the present invention;

Fig. 2 is a side elevation view thereof;

Fig. 3 is a front view of the cutting head of the continuous miner shown in Figs. 1 and 2, showing the relative position of the parts thereof during an instant of their orbital movement;

Fig. 4 is a schematic view of the cutter head shown in Fig. 3, the parts having rotated through an angle increment of approximately 50° from the position shown in Fig. 3, showing the manner in which the parts clear at their point of closest proximity;

Fig. 5 is a sectional view taken along the line 5—5 of Fig. 3, looking in the direction of the arrows;

Fig. 6 is an enlarged front view of one of the cutter bars shown in Fig. 3, and the cutter chain supported thereby and orbitally movable with respect to the cutter bar;

Fig. 7 is a cross-sectional view taken along the line 7—7 of Fig. 3 and looking in the direction of the arrows, showing an idler shoe for adjusting the tension of the cutter chain supported on the cutter bar;

Fig. 8 is a view similar to Fig. 6 but showing the opposite end of the one of the cutter bars, and showing details of a sprocket around which the cutter chain is trained; and Fig. 9 is a section taken along the line 9—9 of Fig. 8 and looking in the direction of the arrows.

Referring now particularly to Figs. 1 and 2 of the drawings, the improved mining machine according to the present invention is referred to generally by the reference numeral 20 and includes a main frame 21 mounted upon spaced crawler treads 22, power for the crawler treads being supplied by motors not shown. The machine 20 includes an improved cutting head referred to generally by the reference numeral 25, which cuts and fragments coal or other mineral from a solid seam 26 thereof to cause the coal to fall from the seam to a mine floor 27, the coal being gathered and conveyed from the mine floor by means of a conveyor 28 made a part of the machine 20. Said machine also includes a discharge boom 29 having a flight conveyor moving longitudinally thereof, a conventional construction for such mining machines, and therefore not described in detail. Power for driving the gathering conveyor 28 extending between the crawler treads 22 and for driving the flight conveyor 31 is supplied by a drive motor 32.

Power for operating the cutter head 25 is derived from a drive motor 33 mounted on top of the main frame 21. A drive shaft 34 is connected to the motor 33 through a flexible coupling 30 and has a driving pinion 36 meshing with a gear 37 fast on a shaft 38. The gear 37 is part of a gear train contained within a housing 35, and said gear train also includes a gear 39 also fast to the shaft 38 and meshing with a gear 41 fast on a shaft 42, the gear 41 also meshing with an identical gear 43 fast upon a shaft 44 spaced from the shaft 42. The two shafts 42 and 44 thereby turn in opposite directions and at the same speed. Shaft 42 extends through a front wall 40 of the housing and has fast at the end thereof a radially-extending arm 46. The shaft 42 also has fast thereto a pinion 47, which through the medium of reaching gears 48 and 49 fast on a shaft 51 drives a pinion 52 fast to a shaft 53 extending through the front wall 40 of the housing 35 and having mounted on the end thereof a radially-extending arm 54.

Shaft 44 has mounted at the end thereof extending through the housing wall 40 a radially-extending arm 56, and the shaft 44 also drives a pinion 57 which, through reaching gears 58 and 59 fast on a shaft 61, drives a pinion 62 fast to a shaft 63 extending through the housing wall 40 and having a similar radially-extending arm 64 at the end thereof.

Referring now particularly to Fig. 3, the paired arms 56 and 64 are arranged to rotate together in a counterclockwise direction at the same speed, and the spaced arms 46 and 54 are likewise arranged to rotate at the same speed in a clockwise direction. Each of the spaced pairs of arms thus far described are joined at their extremities by a cutter bar 66 which is connected pivotally to the free end of the radial arm 64 by means of a pin 67 held rigidly to the arm 64, the bar also being connected to the end of the radial arm 56 by means of a pin 68, the length of the bar 66 being greater than the distance between centers of the shafts 44 and 63 for a purpose as will subsequently appear.

An identical cutter bar 66 is similarly connected to the radial arms 54 and 46, and the description of one of such cutter bars and any appurtenances thereto will suffice for both.

Referring now particularly to Figs. 5 to 9, inclusive, of the drawings, the cutter bar 66 affords a support for an endless cutter chain 70 travelling orbitally with respect to the cutter bar 66. The cutter chain 70 has links 69 supporting bit holders 71 having cutter bits 72 mounted therein, the bit holders 71 and the cutter bits 72 being disposed in a direction towards the working face of the seam 26. A sprocket 73 is held by a key 74 fast to the pin shaft 67 mounted rigidly at each end of the arms 64 and 54, and has the chain 70 trained therearound. The chain is also trained around an essentially semi-circular idler shoe 76 adjusted in position with respect to the end of the cutter bar 66 by means of an adjusting screw and nut 77.

It will be seen that as the arms 54 and 64 rotate with the sprocket 73 fast thereto, the chain 70 will be caused to move orbitally with respect to the cutter bar 66 thereby at all times causing all of the cutter bits to come into contact with the seam 26 in due time.

It will be seen also that as the cutter bars 66, together with the orbitally-movable cutter chains 70 will in their respective clockwise and counterclockwise orbits describe a long, low rectangle having semi-circular contiguous end portions as seen in Fig. 3. The dimensions of the cutter bar 66 are so chosen that they must clear each other in their orbits as seen in Fig. 4, thereby cutting a bore in the seam 26 of the configuration as previously described excepting for the presence of a small core 78 depending from the roof of the seam and a small core 79 extending up from the mine floor 27. The presence of such cores, and their dimension, is not such as will prevent the operation of the gathering conveyor 28 nor the operation of the discharge boom 29.

The face of the cutter bar 61 proximate to the working face is provided with a plurality of swiveling cutter bits 80 which serve to cut in advance of the cutter bar 66, and thus afford clearance for its orbital movement.

It will be apparent that the cutter bits 80 which are mounted in such swivelable fashion upon the cutter bar 66 will always be pointing in a direction for most efficient cutting, that is in a direction corresponding to the tangent to the circle described by each cutter bit 80.

The cutter bits 80 are described in more detail, and claimed in my divisional application, Serial No. 567,006, filed February 21, 1956, for Cutter Bit and Mounting Therefor.

The cutter head 25 in entering a mine seam encounters thrust which is taken by the housing 35 at its front wall 40 by means of rollers 102 mounted in a clevis 103 at the back face of each of the arms, 54, 46, 56 and 64, each of the rollers being supported upon a pin 104 spanning the clevis 103, and the surface of the rollers bearing against a circular rib 106 formed on the front wall 40 of the housing 35.

The material which has been fragmented by the action of the cutter bars 66, cutter chains 70, and the cutter bits 80 is removed from the mine floor by sweeps 108 which extend substantially at right angles to each of the radial arms 54, 46, 56 and 64. As seen more particularly in Figs. 2 and 3, each sweep 108 has a paddle 107 on the end thereof, which is pitched as shown to move the fragmented material away from the seam 26 and toward the conveyor 28.

The mining machine according to the present invention has many advantages over prior machines of the same general type, in that it is possible to mine extremely low coal and at the same time furnish ample space for both operators and timbering or roof pinning alongside the machine. In tramming the machine from its room, the cutter elements need only be moved to the position seen in Fig. 3, in position raised from the mine floor and below the mine roof, thereby removing any possibility of striking the side of the bore made by the machine.

A further and salient advantage of the machine lies in the fact that no cutter chains are necessary for removing the very small rib remaining at the floor and at the mine roof, such ribs being of such small dimension as not to interfere with the operation of the machine.

While the invention has been shown and described in terms of a preferred embodiment thereof, it is not intended that the invention be limited by the precise embodiment herein nor otherwise than by the terms of the claims here appended.

I claim:

1. In a mining machine of the multi-boring type, a main frame having means therewith for propelling same along a mine floor, a cutter head supported on said main frame and comprising a plurality of radially-extending arms, an adjacent pair of said arms being arranged to turn in one rotative direction, and the other adjacent pair of said arms being arranged to turn in an opposite rotative direction, a cutter bar connected to each adjacent pair of radial arms and driven thereby, said cutter bar having orbital movement as said radial arms rotate, a sprocket mounted fast to one each of said pairs of radially-extending arms, a cutter chain supported by said cutter bar and trained around said sprocket, said cutter chain having orbital movement with respect to said cutter bar to cut against said seam and provide clearance for said cutter bar in its orbital movement, a plurality of cutter bits mounted on said cutter bar, said cutter bits being arranged to swivel with respect to said cutter bar so as to take positions which are tangential to the radius of orbital movement of said cutter bar, and a sweep turning with said radial arms for moving cuttings toward the center of the contiguous bores cut by said cutter bars and said cutter chains.

2. In a mining machine of the multi-boring type, a main frame having means therewith for propelling same along a mine floor, a cutter head supported on said main frame and comprising a plurality of radially-extending arms, an adjacent pair of said arms being arranged to turn in one rotative direction, and the other adjacent pair of said arms being arranged to turn in an opposite rotative direction, a cutter bar connected to each adjacent pair of radial arms and driven thereby, said cutter bar having orbital movement as said radial arms rotate, a sprocket mounted fast to one each of said pairs of radially-extending arms, a cutter chain supported by said cutter bar and trained around said sprocket, said cutter chain having orbital movement with respect to said cutter bar to cut against said seam and provide clearance for said cutter bar in its orbital movement, and a plurality of cutter bits mounted on said cutter bar, said cutter bits being arranged to swivel with respect to said cutter bar so as to take positions which are tangential to the radius of orbital movement of said cutter bar.

3. In a mining machine of the multi-boring type, a main frame having means therewith for propelling same along a mine floor, a cutter head supported on said main frame and comprising a plurality of radially-extending arms, an adjacent pair of said arms being arranged to turn in one rotative direction, and the other adjacent pair of said arms being arranged to turn in an opposite rotative direction, a cutter bar connected to each adjacent pair of radial arms and driven thereby, said cutter bar having orbital movement as said radial arms rotate, a plurality of cutter bits mounted on said cutter bar, said cutter bits being arranged to swivel with respect to said cutter bar so as to take positions which are tangential to the radius of orbital movement of said cutter bar, and a sweep turning with said radial arms for moving cuttings toward the center of the contiguous bores cut by said cutter bars.

4. In a mining machine of the multi-boring type, a main frame having means therewith for propelling same along a mine floor, a cutter head supported on said main frame and comprising a plurality of radially-extending arms, an adjacent pair of said arms being arranged to turn in one rotative direction, and the other adjacent pair of said arms being arranged to turn in an opposite rotative direction, a cutter bar connected to each adjacent pair of radial arms and driven thereby, said cutter bar having orbital movement as said radial arms rotate, a sprocket mounted fast to one of each of said pairs of radially-extending arms, and a cutter chain supported by said cutter bar and trained around said sprocket, said cutter chain having orbital movement with respect to said cutter bar.

5. In a mining machine of the multi-boring type, a main frame having means therewith for propelling same along a mine floor, a cutter head supported on said main frame and comprising a plurality of radially-extending arms, an adjacent pair of said arms being arranged to turn in one rotative direction, and the other adjacent pair of said arms being arranged to turn in an opposite rotative direction, a cutter bar connected to each adjacent pair of radial arms and driven thereby, said cutter bar having orbital movement as said radial arms rotate, and a plurality of cutter bits mounted on said cutter bar, said cutter bits being arranged to swivel with respect to said cutter bar so as to take a position which is tangential to the radius of orbital movement of said cutter bar.

6. A cutter bar for a continuous miner having a cutter head including a pair of spaced radially-extending arms rotatable together in a given direction and having said cutter bar mounted on said radially-extending arms and movable in an orbital path therewith, a plurality of cutter bits extending along the length of said cutter bar, said cutter bits extending substantially normally to the plane described by said cutter bar in its orbital movement, an endless cutter chain mounted on said cutter bar, and a sprocket mounted fast to one of said radially-extending arms, said cutter chain being trained around said sprocket so as to cause said cutter chain to have orbital movement with respect to said cutter bar.

7. A cutter bar for a continuous miner having a cutter head including a pair of spaced radially-extending arms rotatable together in a given direction and having said cutter bar mounted on said radially-extending arms and movable in an orbital path therewith, a plurality of cutter bits extending along the length of said cutter bar, said cutter bits extending substantially normally to the plane described by said cutter bar in its orbital movement, and means for enabling said cutter bits to swivel on said cutter bar so as to take positions during the orbital movement of said cutter bar which are tangential to the radius of orbital movement of said cutter bar.

References Cited in the file of this patent

UNITED STATES PATENTS

| | | |
|---|---|---|
| 1,644,943 | Osgood | Oct. 11, 1927 |
| 1,645,003 | Holmes | Oct. 11, 1927 |
| 1,726,963 | McKinlay | Sept. 3, 1929 |
| 2,548,952 | Crossland | Apr. 17, 1951 |
| 2,550,202 | Robbins | Apr. 24, 1951 |
| 2,587,065 | Robbins | Feb. 26, 1952 |
| 2,644,679 | Simmons | July 7, 1953 |